Jan. 23, 1934.　　M. W. BOWEN　　1,944,490
BRAKE
Filed April 22, 1932

Inventor:
Myron W. Bowen
By Williams, Bradbury,
McCaleb & Hinkle
Attys.

Patented Jan. 23, 1934

1,944,490

UNITED STATES PATENT OFFICE 1,944,490

BRAKE

Myron W. Bowen, Detroit, Mich., assignor to Hydraulic Brake Company, Detroit, Mich., a corporation of California Application April 22, 1932. Serial No. 606,783

15 Claims. (Cl. 188—106)

My invention pertains to brakes and is particularly concerned with the provision of a cheap and efficient emergency or parking brake for use in connection with hydraulic service brakes of the type now commonly used on automobiles.

Automobiles provided with mechanical service brakes are commonly provided with emergency or parking brake mechanism which actuates the same brake shoes that form part of the service brake mechanism. This arrangement has the advantage of cheapness and eliminates unnecessary parts and connections which would require additional adjustments by competent mechanics during the life of the automobile.

Numerous attempts have been made to adapt this same practice to automobiles equipped with hydraulically-actuated service brakes, but these attempts have heretofore been commercially unsuccessful due principally to the bulk of the hydraulic wheel cylinders and the resulting lack of adequate space at the most desirable locations in which to install the necessary mechanism for operating the brake shoes by means of the emergency brake lever.

An object of my invention is to overcome these difficulties and provide a simple and efficient arrangement of brake mechanism for automotive vehicles whereby the brake shoes may be hydraulically actuated by means of the usual foot pedal and whereby these same shoes may be efficiently operated through mechanical linkage actuated by the emergency brake lever.

Other objects and advantages will become apparent as the description proceeds.

Figure 1:
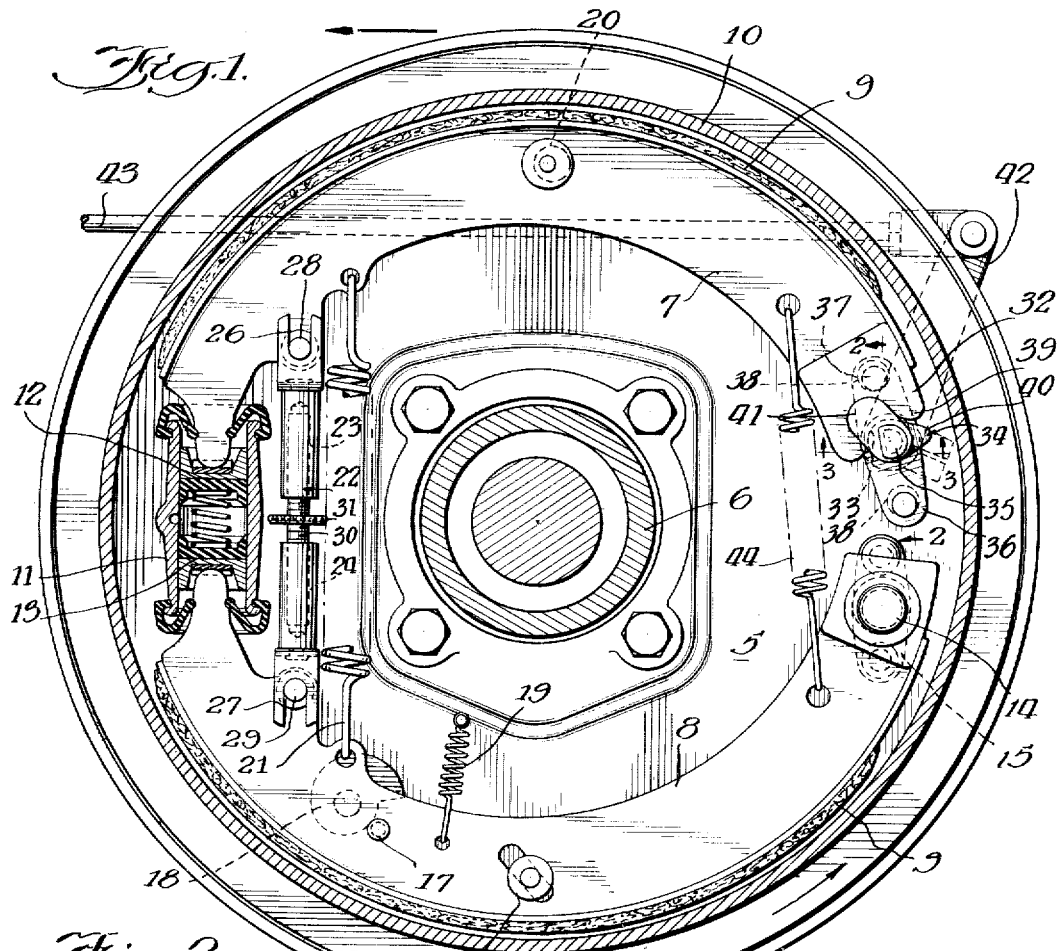
Fig. 1 is a sectional elevation showing the brake mechanism applied to the left rear wheel of an automotive vehicle.
Figure 2:
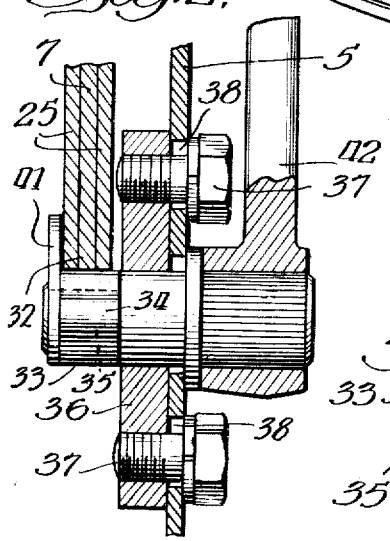
Fig. 2 is a section taken on the line 2—2 of Fig. 1.
Figure 3:
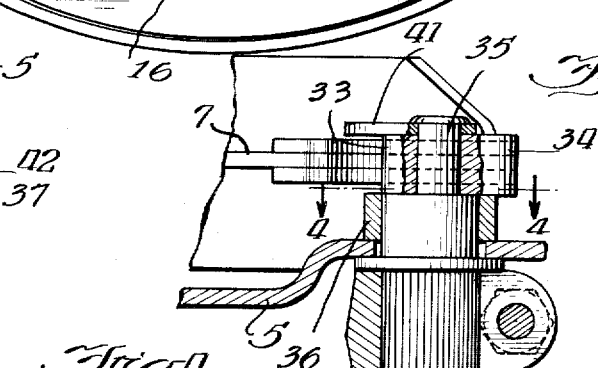
Fig. 3 is a section taken on the line 3—3 of Fig. 1.
Figure 4:
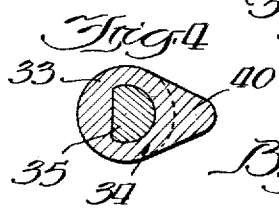
Fig. 4 is a section taken on the line 4—4 of Fig. 3.

Referring to the drawing, I have illustrated my invention as incorporated in braking mechanism comprising a pan 5 bolted to the axle housing 6 and supporting brake shoes 7 and 8, together with the necessary actuating mechanism therefor. The brake shoes carry the usual brake lining 9 which is forcibly brought into engagement with the brake drum 10 which rotates in the direction of the arrow (Fig. 1) when the vehicle is moving in the forward direction, i. e., the direction indicated by the arrow at the top of Fig. 1.

An actuating cylinder 11 is bolted or otherwise suitably secured to the pan 5 and has opposed pistons 12 and 13 for actuating the brake shoes 7 and 8, respectively. Fluid under pressure is forced into the hydraulic cylinder 11 from a master cylinder which may be of the type shown in United States Patent No. 1,847,402, of March 1, 1932, or of any other suitable type.

Brake shoe 8 is pivotally mounted on an eccentric anchor-pin 14 which may be of any conventional type. That part of the pan which supports the anchor-pin 14 is preferably reinforced by a plate 15 bolted or otherwise suitably secured to the pan 5. A guide 16 is provided for the brake shoe 8 and this shoe is normally held so that its pin 17 contacts with an adjustable stop 18 which limits retractile movement of the shoe away from the brake drum.

The shoe 8 is normally held in engagement with the stop by a spring 19. A guide 20 is also provided for the brake shoe 7 and this guide is designed to permit wide latitude of movement of the brake shoe 7, as will be hereinafter described.

A retractile spring 21 is provided for the purpose of withdrawing the brake shoes from engagement with the brake drum and holding them in retracted position. The ends of the brake shoes adjacent the hydraulic cylinder 11 are connected by mechanism indicated generally by reference numeral 22. This mechanism includes threaded sockets 23 and 24 provided with bifurcated slotted ends 26 and 27, respectively, which engage brake shoe pins 28 and 29.

The socket members 23 and 24 are adjustably connected by threaded pin 30 having oppositely threaded ends for engagement with the threaded sockets and provided with a toothed wheel 31 which can be rotated by inserting a screwdriver through a suitable opening in the pan 5. The retractile spring normally holds the pins 28 and 29 in engagement with the inner ends of the slots in the bifurcated ends of the socket members 23 and 24. The retracted position of the brake shoe 8 is determined by adjustable stop 18, whereas the retractile position of the brake shoe 7 is determined by the mechanism 22, plus the adjustable stop 18.

When the brake shoe 7 is moved into engagement with the brake drum by the piston 12, the end 32 of this brake shoe which is provided with wear plates 25 pivots about the cylindrical portion 33 of cam 34 which is keyed to a shaft 35 mounted in a plate 36 which is adjustably attached to the pan 5 by bolts 37 extending through openings 38 which are considerably larger than the bolts 37. The corner 39 of the brake shoe 7 is slightly spaced from the side of the tapered end 40 of the cam to permit slight pivotal movement of the brake shoe 7 about the cylindrical surface of the cam. A guide finger 41 is secured to the end of the shaft 35 and holds the end of the shoe 7 in alignment with the cam.

The cam 34 and shaft 35 are rotated by a lever 42 which is connected to an adjustable pull rod or cable 43 leading to the emergency brake lever of the automobile.

The operation of my invention is as follows:

When the vehicle is traveling in the forward direction and the operator applies the service brake, fluid under pressure is forced into the hydraulic cylinder 11 and the pistons 12 and 13 separate and force the brake shoes 7 and 8 into engagement with the brake drum. During this movement of the brake shoes, the pins 28 and 29 move outwardly in the slotted ends 26 and 27 but the movement of the shoes is insufficient to withdraw the pins from the slots. The shoe 8 is a so-called "forward" shoe, whereas the shoe 7 is a reverse or trailing shoe and, as a result, the shoe 8 gives much higher braking efficiency than does the shoe 7.

Upon release of the foot-pedal, the retractile spring 21 moves the shoes inwardly away from the drum, and the spring 19 assists in withdrawing the shoe 8 from the drum and serves to withdraw the shoe 8 until it contacts with the stop 18. The brake shoes are drawn together until the pins 28 and 29 contact the bottoms of the slots in the ends 26 and 27.

When the emergency brake is applied while the vehicle is traveling in the forward direction, the cam 34 is rotated in a counter-clockwise direction and the tapered end of the cam moves until it engages the end of the brake shoe 7, after which movement of the cam causes both brake shoes to pivot about the anchor-pin 14, the brake shoe 7 acting as a floating shoe which is pivotally connected to the free end of the shoe 8 by means of the mechanism 22. In this manner both the brake shoes 7 and 8 become forward shoes when the vehicle is traveling in the forward direction, and the mechanism gives an extremely efficient braking action.

When the emergency brake lever is released, the parts are in the rest position shown in Fig. 1 of the drawing. In this position the end 32 of brake shoe 7 is held against the cam 34 by spring 44. When the car is traveling in the reverse direction and the emergency or parking brake is applied, both shoes are trailing shoes and the efficiency of the brake mechanism is materially decreased. However, it is not customary to operate an automobile at high speed in reverse, and there is no occasion to use this brake as an emergency brake when the car is traveling in the backward direction. The efficiency of the brake is sufficient at all times to serve as a parking brake for holding the machine against either forward or backward movement.

While I have illustrated and described only a single embodiment of my invention, it is to be understood that my invention is capable of assuming numerous forms and that the scope of my invention is to be limited solely by the following claims.

I claim:

1. In a brake of the class described, the combination of a supporting pan, an anchor-pin adjustable thereon, a brake shoe pivotally mounted on said anchor-pin, a second brake shoe, a hydraulic cylinder interposed between said shoes and operatively connected with one end of each shoe, a cam separably connected with the other end of said second-mentioned shoe and forming a pivot therefor, actuating means for said cam, a brake drum adapted to cooperate with said shoes, and an adjustable connection between said shoes, said connection being adjacent said cylinder.

2. In mechanism of the class described, the combination of a brake drum, a pair of brake shoes for engagement therewith, a pair of pivotal supports for said shoes, means for moving said shoes about said pivotal supports, and cam mechanism for moving one of said shoes from engagement with its pivotal support and into engagement with said drum.

3. In mechanism of the class described, the combination of a support, a cam oscillably mounted on said support, a brake drum, a brake shoe, means holding said shoe in engagement with said cam, said cam having a cylindrical surface forming a pivot for said shoe, means for pivoting said shoe about said cam and into engagement with said drum, and means for operating said cam to force said shoe into engagement with said drum.

4. In mechanism of the class described, the combination of a supporting pan, a hydraulic cylinder vertically mounted on said pan, a pair of brake shoes having ends coacting with said cylinder, a brake drum, a pair of pivotal supports for said shoes, pistons in said cylinder operable to move said shoes about said pivots, and means for moving both shoes about one of said pivots.

5. In brake mechanism of the class described, the combination of a supporting pan, a pair of pivots carried thereby, a pair of brake shoes coacting with said pivots, hydraulic mechanism for moving said shoes about said pivots and into engagement with said drum, an adjustable stop for one of said shoes, a spring for holding said last-mentioned shoe against said stop, a separable connection between said shoes, a spring for connecting said shoes, and means for moving both shoes about one of said pivots.

6. In mechanism of the class described, the combination of a support, a pair of shoes associated therewith, means for guiding said shoes on said support, a pair of pivots carried by said support, hydraulic mechanism for moving said shoes about said pivots, a rotatable brake drum, a separable adjustable connection between said shoes, and means for operating both of said shoes as forward shoes during forward rotation of said drum.

7. In mechanism of the class described, the combination of a support, a rotatable drum, a cam oscillably mounted thereon, said cam having a cylindrical surface, a brake shoe contacting with said surface, means for pivoting said shoe about said cylindrical surface, said cam having a non-cylindrical portion normally spaced from said shoe, and means for bringing said non-cylindrical portion into engagement with said shoe to force said shoe into engagement wtih said drum.

8. In mechanism of the class described, the combination of a support, a pair of opposed brake shoes mounted thereon, a brake drum cooperating with said shoes, means engaging both of said shoes for separating one set of opposed ends of said shoes, and independent means engaging one shoe only for separating the opposite set of opposed ends of said shoes.

9. In mechanism of the class described, the combination of a brake drum, a support, an adjustable anchor-pin mounted thereon, a brake shoe carried by said anchor-pin, a second brake shoe, a cam forming a pivotal support for one end of said second brake shoe, a cam shaft, means for oscillating said shaft to apply said shoe against said drum, a plate in which said shaft is mounted, an adjustable connection between said plate and said support, and means for pivoting said shoes about said cam and anchor-pin.

10. In mechanism of the class described, the combination of a support, a pair of opposed brake shoes mounted thereon, a brake drum cooperating with said shoes, means engaging both of said shoes for separating one set of opposed ends of said shoes and for applying said shoes against said drum, and independent mechanical means engaging one shoe only for separating the opposite set of opposed ends of said shoes and for applying both of said shoes against said drum.

11. In mechanism of the class described, the combination of a support, a pair of opposed brake shoes mounted thereon, a brake drum cooperating with said shoes, means engaging both of said shoes for separating one set of opposed ends of said shoes and for applying both of said shoes against said drum, and mechanical means engaging one shoe only for separating the opposite set of opposed ends of said shoes and for applying both of said shoes against said drum.

12. In mechanism of the class described, the combination of a support, a pair of opposed brake shoes mounted thereon, a brake drum cooperating with said shoes, a brake applying means located between opposed ends of said shoes for moving said shoes into engagement with said drum, a force transmitting connection between said ends of said shoes, said connection separate from said applying means, and a second applying means for said shoes.

13. In mechanism of the class described, the combination of a support, a pair of opposed brake shoes mounted thereon, a brake drum cooperating with said shoes, a brake applying means located between opposed ends of said shoes for moving said shoes into engagement with said drum, an adjustable force transmitting connection between said ends of said shoes, said connection separate from said applying means, and a second applying means for said shoes.

14. In mechanism of the class described, the combination of a support, a pair of opposed brake shoes mounted thereon, a brake drum cooperating with said shoes, a fluid cylinder applying means located between opposed ends of said shoes for moving said shoes into engagement with said drum, a force transmitting connection between said ends of said shoes, said connection separate from said fluid cylinder applying means, and a second applying means for said shoes.

15. In mechanism of the class described, the combination of a support, a pair of opposed brake shoes mounted thereon, a brake drum cooperating with said shoes, a fluid-operated applying means located between opposed ends of said shoes for moving said shoes into engagement with said drum, a force transmitting connection between said ends of said shoes, said connection separate from said applying means, and a mechanical applying means for said shoes.

MYRON W. BOWEN.

DISCLAIMER 1,944,490.—*Myron W. Bowen*, Detroit, Mich. BRAKE. Patent dated January 23, 1934. Disclaimer filed June 24, 1935, by the assignee, *Hydraulic Brake Company*.

Hereby enters this disclaimer to the subject-matter of claim 2 of the above patent except where this claim is limited to a structure in which the cam mechanism moves only one of the shoes from engagement with its pivotal support.

[*Official Gazette July 23, 1935.*]

9. In mechanism of the class described, the combination of a brake drum, a support, an adjustable anchor-pin mounted thereon, a brake shoe carried by said anchor-pin, a second brake shoe, a cam forming a pivotal support for one end of said second brake shoe, a cam shaft, means for oscillating said shaft to apply said shoe against said drum, a plate in which said shaft is mounted, an adjustable connection between said plate and said support, and means for pivoting said shoes about said cam and anchor-pin.

10. In mechanism of the class described, the combination of a support, a pair of opposed brake shoes mounted thereon, a brake drum cooperating with said shoes, means engaging both of said shoes for separating one set of opposed ends of said shoes and for applying said shoes against said drum, and independent mechanical means engaging one shoe only for separating the opposite set of opposed ends of said shoes and for applying both of said shoes against said drum.

11. In mechanism of the class described, the combination of a support, a pair of opposed brake shoes mounted thereon, a brake drum cooperating with said shoes, means engaging both of said shoes for separating one set of opposed ends of said shoes and for applying both of said shoes against said drum, and mechanical means engaging one shoe only for separating the opposite set of opposed ends of said shoes and for applying both of said shoes against said drum.

12. In mechanism of the class described, the combination of a support, a pair of opposed brake shoes mounted thereon, a brake drum cooperating with said shoes, a brake applying means located between opposed ends of said shoes for moving said shoes into engagement with said drum, a force transmitting connection between said ends of said shoes, said connection separate from said applying means, and a second applying means for said shoes.

13. In mechanism of the class described, the combination of a support, a pair of opposed brake shoes mounted thereon, a brake drum cooperating with said shoes, a brake applying means located between opposed ends of said shoes for moving said shoes into engagement with said drum, an adjustable force transmitting connection between said ends of said shoes, said connection separate from said applying means, and a second applying means for said shoes.

14. In mechanism of the class described, the combination of a support, a pair of opposed brake shoes mounted thereon, a brake drum cooperating with said shoes, a fluid cylinder applying means located between opposed ends of said shoes for moving said shoes into engagement with said drum, a force transmitting connection between said ends of said shoes, said connection separate from said fluid cylinder applying means, and a second applying means for said shoes.

15. In mechanism of the class described, the combination of a support, a pair of opposed brake shoes mounted thereon, a brake drum cooperating with said shoes, a fluid-operated applying means located between opposed ends of said shoes for moving said shoes into engagement with said drum, a force transmitting connection between said ends of said shoes, said connection separate from said applying means, and a mechanical applying means for said shoes.

MYRON W. BOWEN.

DISCLAIMER 1,944,490.—*Myron W. Bowen*, Detroit, Mich. BRAKE. Patent dated January 23, 1934. Disclaimer filed June 24, 1935, by the assignee, *Hydraulic Brake Company*.

Hereby enters this disclaimer to the subject-matter of claim 2 of the above patent except where this claim is limited to a structure in which the cam mechanism moves only one of the shoes from engagement with its pivotal support.
[*Official Gazette July 23, 1935.*]